(12) United States Patent  
Yamazaki

(10) Patent No.: US 7,684,137 B2
(45) Date of Patent: Mar. 23, 2010

(54) LENS BARREL, OPTICAL DEVICE AND METHOD FOR MANUFACTURING LENS BARREL

(75) Inventor: Satoshi Yamazaki, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/230,400

(22) Filed: Aug. 28, 2008

(65) Prior Publication Data

US 2009/0059401 A1    Mar. 5, 2009

(30) Foreign Application Priority Data

Aug. 31, 2007 (JP) ............................. 2007-225358
Feb. 15, 2008 (JP) ............................. 2008-035088

(51) Int. Cl.
G02B 7/02 (2006.01)
G02B 15/14 (2006.01)
G03B 17/00 (2006.01)

(52) U.S. Cl. ................. 359/826; 359/823; 359/697; 359/701; 396/542; 396/349

(58) Field of Classification Search ........... 359/822, 359/823, 826, 694–704; 396/72, 73, 349, 396/350, 535, 542; 250/201.7
See application file for complete search history.

(56) References Cited

U.S. PATENT DOCUMENTS 4,750,821 A * 6/1988 Yamamoto et al. ........... 359/697
5,581,412 A * 12/1996 Tanaka ....................... 359/697
5,809,361 A * 9/1998 Nomura et al. ............. 396/542

FOREIGN PATENT DOCUMENTS

JP    A-2002-40311    2/2002
JP    A-2006-71953    3/2006

* cited by examiner

Primary Examiner—Loha Ben
(74) Attorney, Agent, or Firm—Oliff & Berridge, PLC

(57) ABSTRACT

A lens barrel includes a first barrel, a second barrel having an inner face facing an outer face of the first barrel, and a circuit board supported by the second barrel. The circuit board is provided between the first barrel and the second barrel. The circuit board comprises a first circuit board and a second circuit board, the first circuit board is provided as substantially parallel with an optical axis of the optical system, the first circuit board and the second circuit board are provided at a crossing direction.

30 Claims, 11 Drawing Sheets

LENS BARREL, OPTICAL DEVICE AND METHOD FOR MANUFACTURING LENS BARREL

BACKGROUND OF THE INVENTION

1. Field of the Invention

The present invention relates to a lens barrel, an optical device having the lens barrel such as a camera and the like, and method for manufacturing lens barrel.

2. Description of the Related Art

In a lens barrel used for an optical device such as camera and the like, a lens barrel to which auto-focus function and hand blurring compensation function are added has been used.

In a lens barrel to which such functions are added or other lens barrel, there is a case that a circuit board is equipped in a lens barrel (refer to Japanese Patent Publication No. 2006-71953).

SUMMARY OF THE INVENTION

An object of the present invention is to provide a lens barrel and an optical device which are available to reduce the size.

In order to achieve the above purpose, a lens barrel according to first aspect of the present invention comprises:

a first barrel;

a second barrel having an inner face facing an outer face of said first barrel; and a circuit board supported by said second barrel, said circuit board provided between the first barrel and the second barrel.

A method for manufacturing lens barrel according to first aspect of the present invention comprises:

providing a second barrel at an outer circumference side of a first barrel; and attaching a circuit board, on which an electronic component is provided, to said second barrel so that the circuit board faces an outer circumferential surface of said first barrel and an inner circumferential surface of said second barrel.

In the lens barrel and manufacturing method thereof according to the first aspects of the present invention, it is possible to make a space at the inner circumferential side of the circuit board, because a circuit board is supported by the second barrel positioned at an outer circumference side and not by the first barrel positioned at an inner circumference side. Therefore, it becomes available to arrange other components to the space and reducing the size of the lens barrel becomes possible.

Said second barrel may be a fixed barrel so as not to cause relative movement with respect to said first barrel.

The method for manufacturing lens barrel of the present invention may further comprise steps of;

providing a control circuit at an inside of said second barrel to process a signal supplied from said electronic component; and connecting said electronic component and said control circuit via a connecting portion having lower rigidity with respect to said circuit board.

The lens barrel of the present invention may comprise:

an optical system supported by at least one of said first barrel and said second barrel, wherein said circuit board may comprises a first circuit board and a second circuit board, said first circuit board may be provided in substantially parallel with an optical axis of said optical system, and said first and said second circuit boards are provided at a crossing direction.

The lens barrel of the present invention may further comprise;

an electronic component provided on said first circuit board;

a control circuit provided on said second circuit board, which performs controlling by using a signal supplied from said electronic component; and a connecting section having low rigidity with respect to said first and second circuit boards, which connects said first circuit board and said second circuit board.

Angular velocity sensors may be equipped with said first circuit board and said second circuit board respectively. By the angular velocity sensors equipped to the circuit board, it becomes possible to detect accurately angular velocities in mutually vertical directions at a plane which is vertical to an optical axis of the lens barrel, because the circuit board is positioned with high accuracy and is equipped at an inner portion of the lens barrel.

The lens barrel of the present invention may further comprise:

a control circuit provided at an inner portion of said second barrel to perform controlling by using a signal supplied from said angular velocity sensors; and a flexible circuit board having low rigidity with respect to said first and said second circuit boards, which connects said angular velocity sensors and said control circuit.

Said control circuit may be provided on at least one of said first circuit board and said second circuit board, and the other circuit different from the control circuit is provided on the other one of them.

Said control circuit may be provided on one of said first circuit board and said second circuit board, and a high voltage output circuit is provided on the other of said first circuit board and said second circuit board, which outputs a voltage higher than a voltage provided to said control circuit.

Said circuit board may be composed of a rigid board. The rigid board is composed by a base plate formed by impregnating aramid fiber or glass fiber sheet with thermosetting resin such as epoxy resin and the like, and then, adding heat and pressure thereto for curing. Alternatively, the rigid board is composed by impregnating a paper with thermosetting resin such as phenol resin and the like, then, adding heat and pressure thereto for curing. The rigid board has a high stiffness property with respect to a flexible base plate and is resistant to heat and shock.

Said circuit board may be provided with a space apart from said first barrel. By making such the constitution, it could facilitate the creation of the space at the inner circumferential side of the circuit board.

A moving barrel may be provided between said first barrel and said second barrel, said moving barrel holding said optical system and relatively moving along an optical axis direction with respect to said first barrel and said second barrel.

A detecting portion may be provided on an inner circumferential side of said circuit board to detect the movement of said moving barrel. Since a space is given at an inner circumferential side of the circuit board, reducing the size of the lens barrel can be achieved by effectively using this portion.

A motor may be provided and fixed on at least one of said first barrel and said second barrel so as to move said moving barrel, and said circuit board may be provided substantially parallel to a rotation axis of said motor. Although noise is likely occur to a motor rotation axis direction, by the circuit board equipped parallel to the motor rotation axis, the noise will be hard to input to the wiring of the circuit board.

Said circuit board may be provided on a portion where said motor is not provided along a circumference direction of said first barrel and said second barrel. This is in order to eliminate the noise from the motor.

Said second barrel may comprise a first groove portion to which a first end portion provided at one end of said circuit board is inserted, a second groove portion to which a second end portion opposite to said first end portion is inserted, and a contact portion to which a third end portion which intersects with said first end portion and said second end portion. In that case, because attaching the circuit board can be completed by only inserting the circuit board to the groove portion formed on the second barrel, the attaching operation is highly easy. Also, since this is a plug-in type, it is not necessary to administrate the tightening torque which is different from a screw (bis) fixture. Further, since these grooves can be easily formed to the second barrel with a high degree of accuracy positioning, a positioning accuracy for the circuit board is increased compared to a screw (bis) fixture or thermal swaging. Further, forming the grooves does not require a space which is different from fixing portion of the bis fixture, so that it is possible to reduce the size of the lens barrel further.

An elastic member to provide an elastic force to a fourth end portion opposite to said third end portion of said circuit board may be provided. According to such constitution, the elastic member exerts dislocating prevention function and it is possible to prevent the circuit board movement in the lens barrel. Also, the circuit board is available to reinforce rigidity of a second fixed barrel and a covering member.

Said circuit board may comprise a fist base plate and a second base plate which are facing each other. By arranging the first base plate and the second base plate as facing each other, number of electronic components to be equipped on the base plate can be increased in a smaller space.

Said first base plate may be provided on a closer side to said first barrel with respect to said second base plate, and comprise a larger area with respect to said second base plate. In that case, number of electronic components to be equipped on the base plate can be increased further. Furthermore, because a side where is closer to the first barrel is positioned at an inner circumferential side compared to said second base plate, there is no problem even if an area of the first base plate is increased.

A lens barrel comprises an optical system held at least one of said first barrel and said second barrel, wherein said circuit board may be provided on a plane which does not pass through an optical axis of said optical system.

Said circuit board may be fixed by said first barrel and said second barrel. Said circuit board may be provided on a plane which passes through an optical axis of said optical system.

A lens barrel according to second aspects of the present invention comprises:

a first barrel;

a second barrel having an inner face facing an outer face of the first barrel, a circuit board provided between an outer face of said first barrel and an inner face of said second barrel, said circuit bard supported by said first barrel, a control circuit mounted on said circuit board to perform controlling necessary for image taking;

an adjusting component provided on said circuit board to adjust property of said control circuit; and a removable member provided removably from said second barrel and facing said adjusting component, said removable member including switching portion so as to switch the controlling by said control circuit.

Said second barrel may include a through hole at a portion facing said adjusting component, said removable member may be provided on said through hole of the second barrel.

A lens barrel of the present invention may comprise:

an optical system held on at least one of said first barrel and said second barrel, wherein said circuit board is provided on a plane which passes through an optical axis of said optical system.

An optical device such as a camera and the like according to the present invention comprises the lens barrel as any one of the above mentioned.

DESCRIPTION OF THE PREFERRED EMBODIMENTS

First Embodiment

Figure 1:
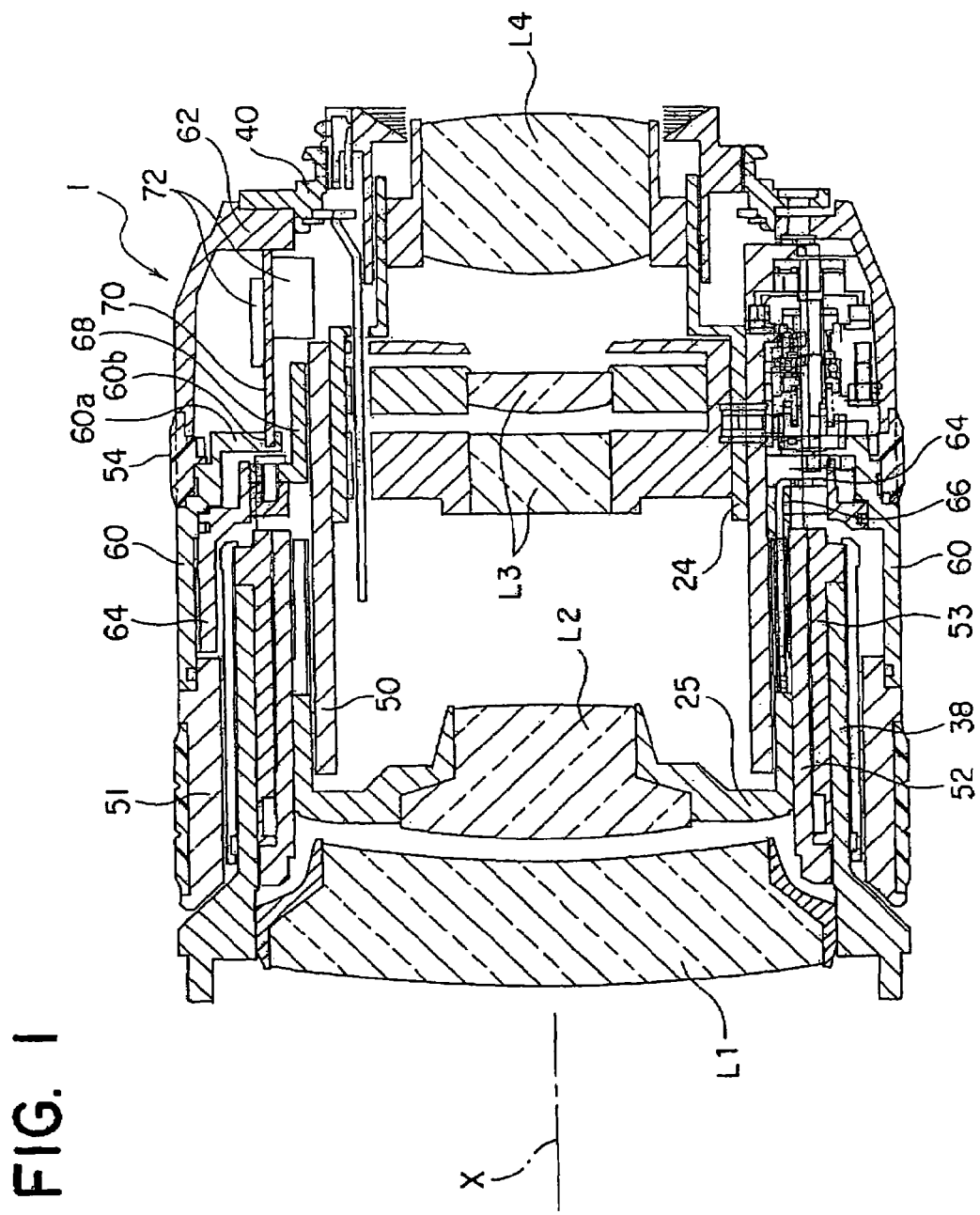
FIG. 1 is a schematic longitudinal cross sectional view of a lens barrel according to one embodiment of the present invention.

As shown in FIG. 1, a lens barrel 1 according to the present embodiment comprises an image shooting optical system formed by four lens groups of a first lens group L1, a second lens group L2, a third lens group L3 and a fourth lens group L4, and is an exchangeable lens available to operate changing a focal distance continuously (zooming action).

Each of the fist lens L1 to the fourth lens group L4 acts an individual rectilinear movement along an optical axis direction by zooming action. The lens barrel 1 of the present embodiment is so-called internal focusing type (inner focusing type) lens barrel, and only the second lens group L2 engages in rectilinear movement to the optical axis direction at a focusing action. The second lens group L2 corresponds to a lens for focusing (focusing lens).

The image shooting optical system of the present embodiment is a lens that a necessary extension amount of the second lens group L2 changes in response to a zooming position (focal distance) when focusing operation. The second lens group L2 is fixed to a focusing lens frame 25, a focus cam groove (also referred to as "focus cam"), which is not shown, is formed on the lens frame 25.

This focus cam groove maintains focusing conditions even when the zooming position changes by compensating the necessary extension amount of the second lens group L2 which is changed in response to the zooming position of the image shooting optical system and also compensates the extension amount of the second lens group L2 by a constant rotating operation amount (herein after simply referred to as "extension amount compensation"). The extension amount compensation is realized by the lens barrel 1 of the present embodiment.

The lens barrel 1 comprises a fixed barrel 50, a zoom operation ring 51, a zoom driving barrel 53, a zoom guiding barrel 52, a cam barrel 24, a focusing lens frame 25, a first lens 38 the like for movably maintaining the first lens group L1 to the fourth lens group L4.

The fixed barrel 50 is a cylindrical member which does not move against a camera body which is not shown, at zooming operation and focusing operation. A lens mount 40 is fixed to the fixed barrel 50, and the lens mount 40 is movably equipped to the camera body which is not shown.

Note that unless otherwise particularly alluded to, in the following explanation, movement in the direction parallel to the optical axis X of an imaging optical system based on the fixed barrel 50 will be called "advance". Further, "rotation" will indicate rotation about the optical axis X. Also, the direction parallel to the optical axis X of the imaging optical system and moving away from the lens mount 40 will be called the "front (object side)" and the one moving close to the lens mount 40 will be called the "rear (image plane side).

The zoom operation ring 51 is a member rotating due to a rotational drive force by direct manual operation of the photographer at the time of a zoom operation. The zoom operation ring 51 is formed at its inner circumference with grooves parallel to the optical axis direction comprised of a plurality of advancing grooves at approximately equal intervals in the circumferential direction. The zoom operation ring 51 in the present embodiment turns in a range of a predetermined angle from a wide angle end to a telescope end.

The zoom drive barrel 53 is attached rotatably to the outer circumference of the zoom guide barrel 52 so as to rotate with respect to a zoom guide barrel 52 arranged at its inner circumferential side but not to relatively move in the optical axis X direction, and to advance together with it. The zoom drive barrel 53 is formed with a plurality of drive force transmission pins, engaging with the advancing grooves formed at the inner circumference of the zoom operation ring 51, at approximately equal intervals in the circumferential direction at the outer circumference of the rear end side of the drive barrel 53.

These transmission pins transmit the rotation drive force from the zoom operation ring 51 to the zoom drive barrel 53. In accordance with the zoom operation ring 51, the zoom drive barrel 53 rotates in the range of a predetermined angle from the wide angle end to the telescopic end.

By the driving barrel 53 being rotated about the optical axis X with respect to the guide barrel 52, the first group barrel 38 can advance or retract with respect to the drive barrel 53 and the guide barrel 52. Note that the first group barrel 38 has lens group L1 fixed to it.

By rotating the driving barrel 53, the cam barrel 24 is made to rotate about the optical axis X and is made to move in the optical axis X direction. A third group lens cam grooves and a fourth group lens cam grooves are formed on the cam barrel 24.

By engaging cam pins to these cam grooves, when the cam barrel 24 moves to the optical direction so as to be rotated by the rotation of the driving barrel 53, a third lens holding barrel which supports the third lens group L3 moves to the optical axis X direction without rotation. Also, in response to the rotation and the advance movement of the cam barrel 24, a fourth lens holding barrel which supports the fourth lens group L4 moves to the optical axis X direction without rotation.

The fourth lens group L4 and the third lens group L3 are supported by the cam barrel 24 arranged at the inner circumferential side of the fixed barrel 50, so that they are structures to be resistant to deviation from the optical axis. Further, in the front of the third lens holding barrel which holds the third lens group L3 and at the rear of the second lens group L2 (image plane side), a vibration reduction system is arranged. The vibration reduction system eliminates the effects of the vibration of the lens barrel 1 at the image plane side of the second lens group L2.

The focus lens frame 25 is arranged at the outer circumferential side of the front of the fixed barrel 50 and the inner circumferential side of the guide barrel 52. The lens frame 25 has the second lens group L2 fixed thereto. The lens frame 25 is formed with focus cam grooves at a plurality of positions at equal intervals in the circumferential direction.

At the rear side of the lens frame 25 in the optical axis X direction, there is a drive force transmission part receiving rotation drive force (focus drive force) selectively from a focus motor or focus operation ring 54. The drive force transmission part has an engagement key 66 for transmitting the focus drive force engaged with it, but at the time of a zoom operation, this engagement key 66 is designed not to rotate by the drive resistance force imparted to the focus motor and focus operation ring 54. That is, at the time of zoom operation, the second lens group L2 held by the lens frame 25 moves in the optical axis X direction without rotating about the optical axis X.

For example, the focusing operation is performed as follows. Namely, the lens frame 25 is rotated by selectively transmitting a rotational drive force (focus drive force) from a focus motor or focus operation ring 54 to a drive force transmission part provided at a rear end side of the lens frame 25 in the optical axis direction, via an interlocking barrel 64 and the engagement key. For this reason, the lens frame 25 moves relative to the guide barrel 52 in the X-axial direction, the second lens group L2 is made to move relative to the first lens group L1 in the X-axial direction, and a focusing operation becomes possible.

A position detecting encoder brush 68 is fixed on the interlocking barrel 64 by a bis and the like. The encoder brush 68 slidingly contacts with the outer circumferential face of the fixed barrel 50 and rotates with the interlocking barrel 64, so as to make available to detect relative position of the interlocking barrel 64 with respect to the fixed barrel 50. The positional information detected by the encoder brush 68 is used as focusing information.

The zoom operation ring 51 is held rotatably about the optical axis X with respect to the most outer circumferential fixed barrel 60 of the lens barrel 1. A covering member 62 is detachably fixed on an image plane side end portion of the optical axis X at the most outer circumferential fixed barrel 60. The most outer circumferential fixed barrel 60 and the covering member 62 are fixed to the fixed barrel 50 directly or indirectly, and are fixing member positioned at the most outer side of the lens barrel 1. A lens mount 40 is fixed at the image plane side end portion of the covering member 62.

Figure 2:
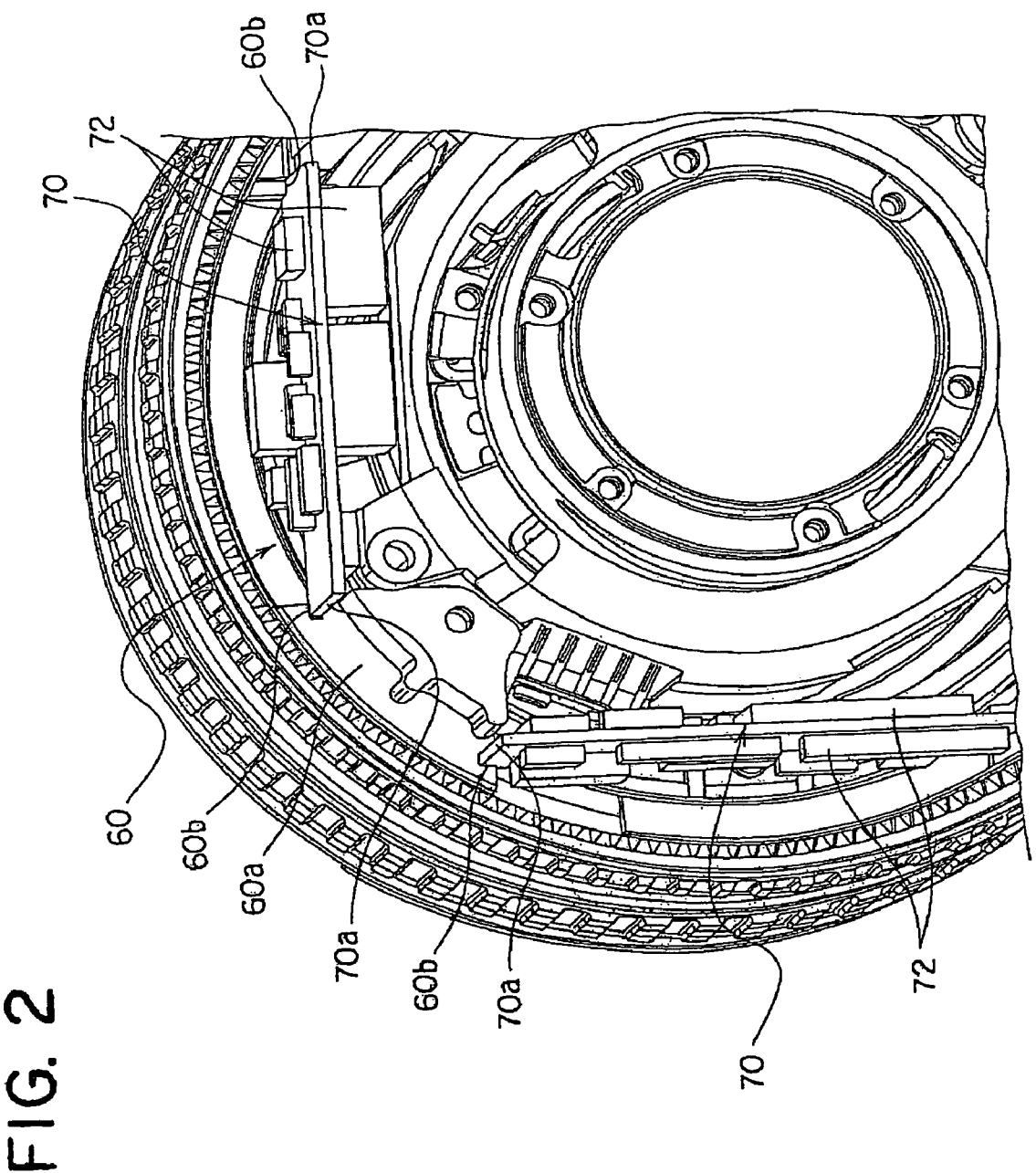
FIG. 2 is a main section perspective view of the lens barrel in case that a covering member shown in FIG. 1 is removed.

The focus operation ring 54 which is rotatable about the optical axis X, is equipped between the most outer circumferential fixed barrel 60 and the covering member 62. At an inner circumferential side of the focus operation ring 54 or the covering member 62 and at the image plane side end portion of the most outer circumferential fixed barrel 60, as shown in FIG. 1 and FIG. 2, an inward convex edge 60*a*, which projects towards the inner circumferential side in a substantially vertical plane to the optical axis X, is formed integrally with the fixed barrel 60. The inward convex edge 60*a* is formed on a plurality of positions with predetermined intervals along the circumferential direction, at an inner circumferential side of the focus operation ring 54 or the covering member 62.

For example, as an example shown in FIG. 2, the inward convex edge 60*a* is formed at three positions with predetermined intervals along the circumferential direction. Holding grooves 60*b* are formed at both or one side of the circumferential direction of the inward convex edge 60*a*. The holding grooves 60*b* are formed toward a direction substantially parallel to the optical axis X.

End portions 70*a* of the circuit board 70 of respective front side of the optical axis direction can be inserted in each of the holding grooves 60*b*. Namely, both side end portions 70*a*, which are front of the optical axis direction in the circuit board 70, are held detachably by the holding grooves 60*b*. Also, rear ends of the circuit board 70 at the optical direction contact with an inner face of the covering member 62 positioned at an opposite side of the insert direction of the circuit board which is inserted into the holding grooves 60*b* to become prevention of dislocating the circuit board 70. The circuit board 70 whose both ends 70*a* are inserted into the holding groove 60*b* is arranged parallel to the optical axis X.

In the present embodiment, at a surface and/or back face of the circuit board 70, various electronic components 72 are mounted.

Figure 3A:
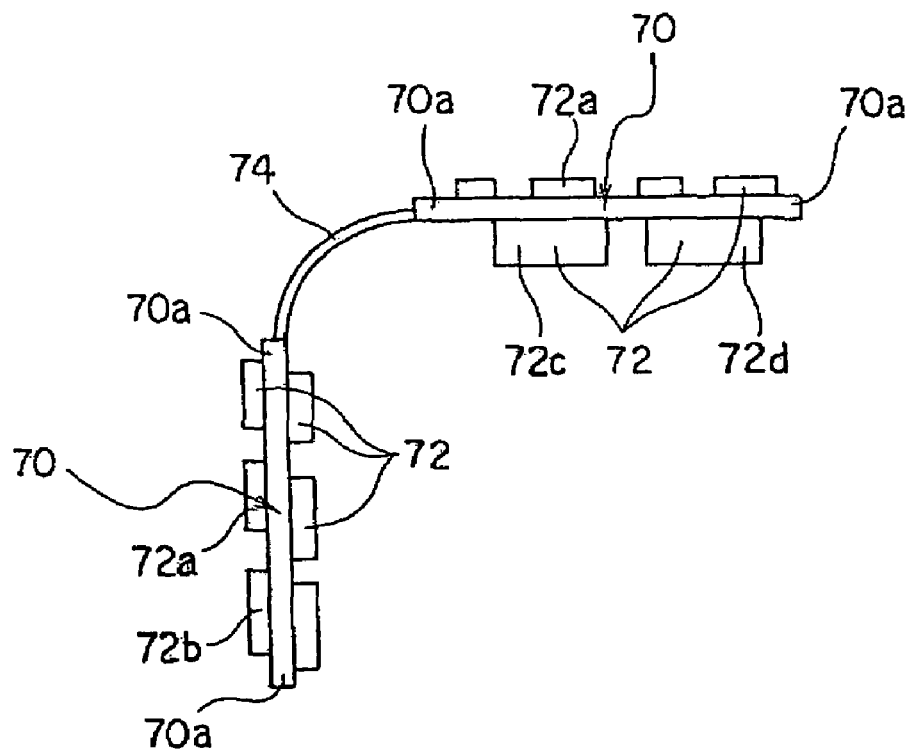
FIG. 3A and FIG. 3B are side views of circuit boards used for lens barrel according to the other embodiments of the present invention.

One of a plurality of the electronic components 72 is, for example, an angular velocity sensor such as a gyro sensor and the like. In FIG. 3A, for example, a referral numeral 72*a* is an angular velocity sensor, and a control circuit 72*b* to perform control by using a signal supplied from the angular velocity sensor is CPU (central processing unit), and is a chip component. The control circuit 72*b* may control AF and the like by using signals other than the signal supplied from the angular velocity sensors. High voltage output circuits 72*c* and 72*d* are chip components to output a voltage higher than a voltage provided to the control circuit 72*b*. The high voltage output circuits 72*c*, 72*d* are boost circuits so as to occur high voltage which is necessary to drive, for example, a focus motor to drive a lens such as SWM (Silent Wave Motor).

In the present embodiment, holding grooves 60*b* are formed on the inward convex edge 60*a* to which two circuit boards 70 are arranged along the circumferential direction. The circuit boards 70 are arranged as intersect in right angle (90°) respectively at an inner circumferential side of the focus operation ring 54 and the covering member 62 and an outer circumferential side of the position detecting encoder brush 68. The two circuit boards 70, for example, as shown in FIG. 3A, may be electrically connected by a flexible wiring (flexible circuit board) 74 having lower rigidity with respect to the circuit board 70.

In the present embodiment, the circuit board 70 is composed of a rigid base plate. The rigid board is, for example, composed by a base plate formed by impregnating aramid fiber or glass fiber sheet with thermosetting resin such as epoxy resin and the like, then, adding heat and pressure thereto for curing, polyethylene terephthalate (PET), or a base plate formed by impregnating a paper with phenol resin and the like, then, adding heat and pressure thereto for curing. The rigid plate has a higher stiffness property with respect to a flexible base plate and is resistant to heat and shock. By composing the circuit board 70 of the rigid board, an angular velocity can be detected accurately without deflecting the circuit board 70, even if the angular velocity sensor is equipped to the circuit board 70. In the example shown in the drawing, the circuit board 70, to which the control circuit 72*b* is provided, and the circuit board 70 to which the high voltage output circuits 72*c* and 72*d* are provided, are provided at a substantially orthogonal angle. Although areas of the circuit board 70 to which the control circuit 72 is provided, and the circuit board 70 to which the high voltage output circuits 72*c* and 72*d* are provided, may be identical, the area of the circuit board 70 to which the control circuit 72 is provided may be larger with respect to the area of the circuit board 70 to which the high voltage output circuits 72*c* and 72*d* are provided.

In the lens barrel 1 of the present embodiment, because the circuit board 70 is held to the most outer circumferential fixed barrel 60 positioned at an outer circumferential side not to the fixed barrel 50 positioned at the inner circumferential side, a space can be made at the inner circumferential side of the circuit board 70. Therefore, it becomes available to arrange other components such as the encoder brush 68 and the like at the space portion, so that it is possible to reduce the size of the lens barrel 1.

In case of the encoder brush 68, during manufacturing process thereof, sometime a fine adjustment will be necessary. In the present embodiment, the fine adjustment for the encoder brush 68 is available, due to removing out the circuit board 70 from the holding groove 60*b*

Also, in the present embodiment, because attaching the circuit board 70 is completed only by inserting the circuit board 70 to the holding groove 60*b* formed on the inward convex edge 60*a* of the most outer circumferential fixed barrel 60, installation work thereof is significantly easy. Also, because it is an insertion type, it is not necessary to administrate tightening torque which is different from a screw (bis) fixture. Further, since the holding grooves 60*b* can easily be formed to the most outer circumferential fixed barrel with high accuracy positioning, a positioning accuracy for the circuit board 70 to be positioned at the holding grooves 60*b* is increased compared from a screw (bis) fixture or thermal swaging. Further, forming the grooves does not require a space which is different from fixing portion of the bis fixture, and it is possible to reduce the size of the lens barrel further.

Furthermore, in the present embodiment, the covering member 62 is equipped to the most outer circumferential fixed barrel 60 at an opposite side of the inserting direction of the circuit board 70 to be inserted into the holding grooves 60*b*. Therefore, with a condition that the covering member 62 is equipped, the circuit board 70 is protected to displacement, and also, the covering member 62 is used as a holding portion to hold the circuit board 70. Therefore, it is not only possible to prevent the circuit board 70 from moving in the lens barrel 1, but also, the circuit board 70 can be used as a reinforcement for the most outer circumferential fixed barrel and the covering member 62.

Note that, in FIG. 1, although a contact portion of the end portion of the circuit board 70 and the covering member 62 can be contacted directly, the end portion of the circuit board 70 and the covering member may be contacted by interposing an elastic member (not shown) such as rubber member and the like therebetween. In this case, the circuit board 70 is pressed to the holding groove 60*b* direction by a resilient force of the elastic member.

Also, by attaching the circuit boards 70 to the holding grooves 60b, they are arranged substantially vertical, and equipped in the lens barrel 1 with high degree of positioning. Therefore, by providing the angular velocity sensors to the respective circuit boards 70, it becomes available to accurately detect angular velocities at vertical directions each other in a vertical plane to the optical axis X of the lens barrel 1. Thus, angular velocity information which is necessary for blurring compensation controlling can be detected accurately.

Figure 3B:
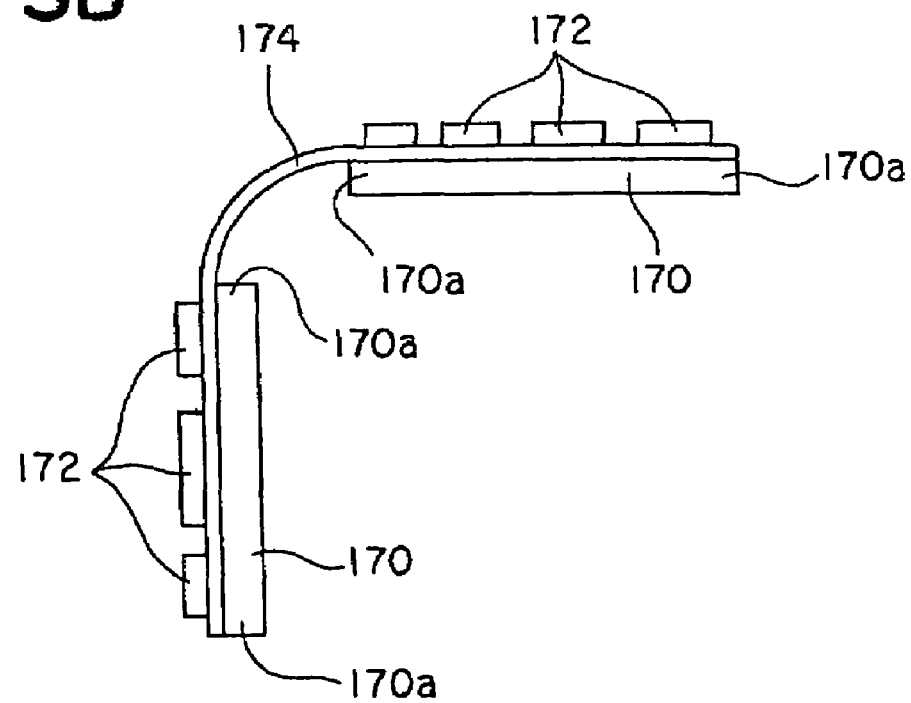

Also, in the above mentioned embodiment, for example, a reinforcing board 170 having rigidity comparatively without being easily deformed, may be fixed to longitudinal both end portions of a single flexible circuit board 174 which is easily deformable by human power, by means such as bonding or fusion bonding, as shown in FIG. 3B.

The reinforcing board 170 is fixed to the flexible circuit board 174, and various electronic components are mounted on an opposite side face of the flexible circuit board 174. The respective end portions 170a in the respective reinforcing board 170 are inserted to the holding grooves 60b shown in FIG. 1 and 2. In this embodiment, the respective reinforcing board 170 becomes a part of the circuit board. As the reinforcing board 170, although it is not particularly limited, for example, a high rigidity resin base plate such as polyethylene terephthalate (PET) base plate is used.

Figure 12:
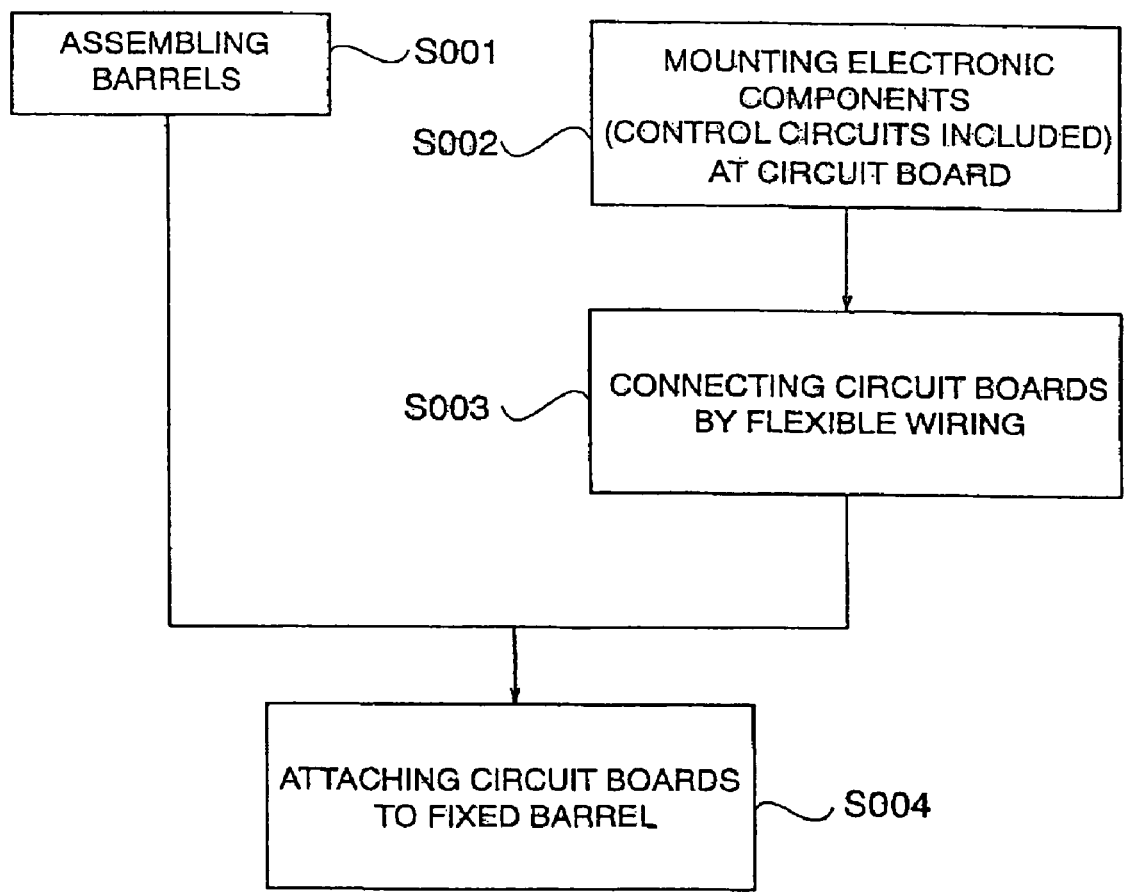
FIG. 12 is a flow chart showing a method for manufacturing lens barrel according to an embodiment of the present invention.

Although a method for manufacturing lens barrel according to the above mentioned first embodiment is not particularly limited, for example, it is operated as shown in FIG. 12. Firstly, in a step S001, assembling the respective fixed barrel 50, the zoom driving barrel 53, the interlocking barrel 64 and the most outer circumferential fixed barrel 60 and the like which constitute the lens barrel 1. In the present embodiment, the most outer circumferential fixed barrel 60 is arranged at an outer circumferential side of the fixe barrel 50. In a different process from the assembling respective barrels, in a step S002, various electronic components 72 are mounted at the circuit board 70 as shown in FIG. 3A. The angular velocity sensors 72a, the control circuits 72b, the high voltage output circuits 72c, 72d and the like are included in the electronic components 72. When before and after or at the same time of mounting the various electronic components 72 on the circuit board 70, the circuit boards 70 are electrically connected by the flexible wiring (flexible circuit board) 74 in a step S003 shown in FIG. 12.

Subsequently, in a step S004 shown in FIG. 12, the circuit board 70 is attached to the fixed cylinder 60 by inserting the side edge portions 70a of a pair of the circuit boards 70 to the respective holding grooves 60b of the fixed barrel as shown in FIG. 2. Note that the flexible wiring 74 is not shown in FIG. 2. In a flow chart shown in FIG. 12, as shown in FIG. 3A, although the circuit boards 70 are attached to the fixed barrel 60 after connecting the circuit board 70 by the flexible wiring 74, in other embodiments, the flexible wire 74 may be connected after the circuit boards 70 are attached to the fixed barrel 60.

Also, in the case of the main control circuit of the lens barrel is not arranged on the circuit boards 70 shown in FIG. 2, the electronic components on the circuit board 70 and the main control circuit may be connected by a flexible wiring (having lower rigidity with respect to the circuit board) which is different from the flexible wiring shown in FIG. 3A. The main control circuit to process signals supplied form the electronic components 72 may be provided at an inside of the fixed barrel 60 in advance.

Second Embodiment

Figure 4:
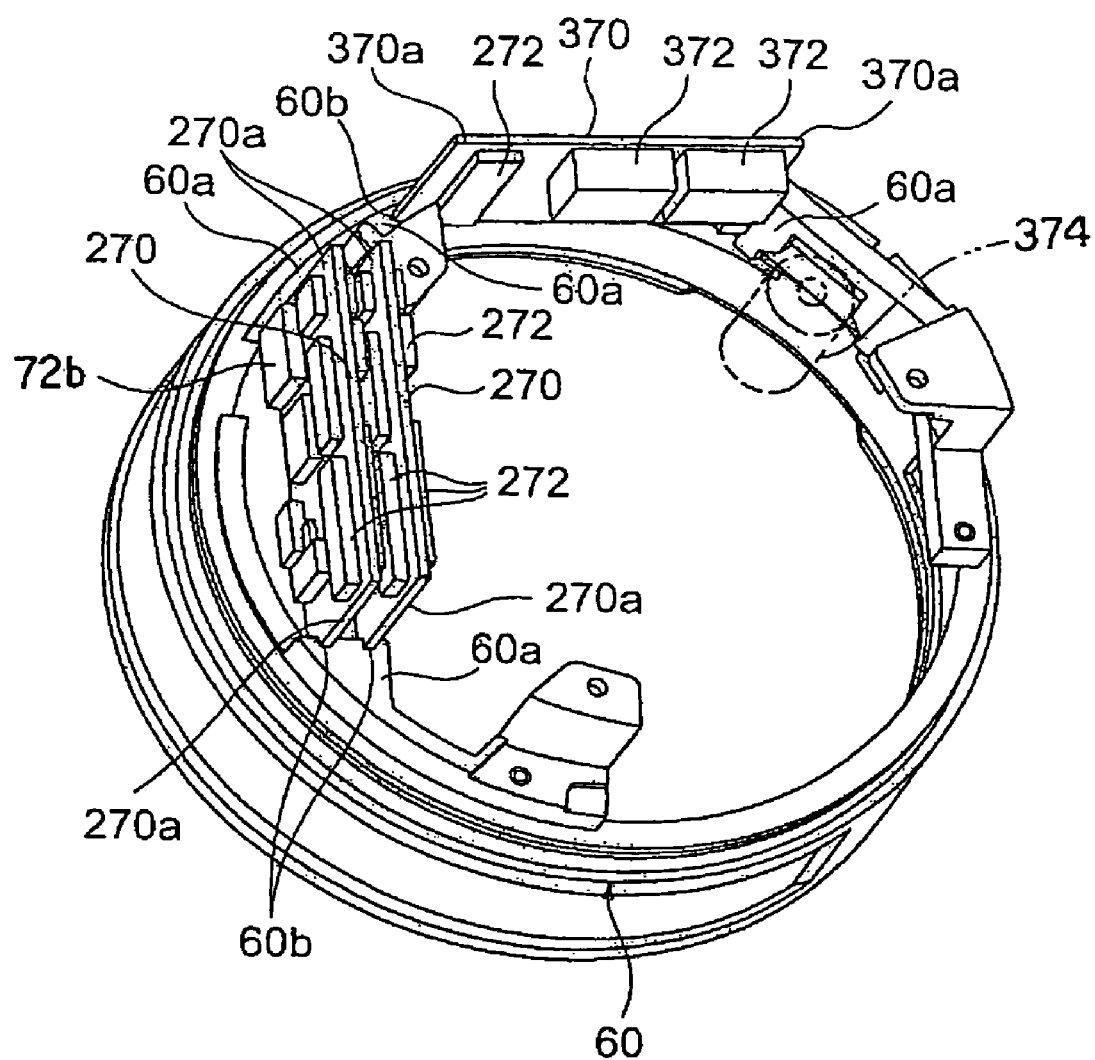
FIG. 4 and FIG. 5 are perspective views of one part of a lens barrel according to the other embodiment of the present invention.

In a second embodiment of the present invention, other than specified in following, it is similar with the above mentioned first embodiment, and functions and effects similar to the first embodiment will be achieved. As shown in FIG. 4, more than two holding grooves 60b are respectively formed at a pair of inward convex edges 60a laying next to each other formed at an inside of the fixed barrel 60. Each side edge portion 270a which are front of the optical axis direction in the respective circuit board 270 are inserted detachably to the holding groove 60b formed on the adjacent pair of the inward convex edges 60a, and the circuit boards 270 are parallel arranged as overlapping more than two along a radial direction.

The circuit boards 270 arranged as overlapping more than two of them are electrically connected to a circuit board 370, which is arranged as a substantially vertical to the circuit boards 270, by a flexible wiring 74 shown in FIG. 3A. Electronic components 272, mainly such as control circuits and sensors, driven by relatively low electric voltage are equipped on the circuit boards 270 arranged as overlapping more than two. A control circuit (chip component) 72b is mounted on the circuit board 270. Also, comparatively high voltage electronic components 372 such as a boost circuit and the like are equipped on the circuit boards 370 arranged substantially vertical to the circuit boards 270 which are arranged as overlapping more than two.

Note that, electronic components 272 driven by comparatively low electric voltage such as an angular velocity sensor and the like are also mounted on the circuit board 370 to which comparatively high voltage electronic components 372 are equipped. These electronic components 272 are arranged near the other circuit board 270 and connected with electronic components 272 of the other circuit board 270. A pair of the angular velocity sensor used for blurring compensation controlling and the like is preferably arranged at positions which are vertical each other. Accordingly, the electronic component 272 composed of one of the angular velocity sensors is arranged to the circuit board 370, and the other electronic components 272 including the other angular velocity sensors and other control circuit 72b or the like is arranged to the other circuit board 270.

The electronic components 372 having comparatively high voltage are equipped on the circuit boards 370 at a position as far from the other circuit board 270 as possible. A stepping motor 374 connected with the electronic components 372 such as the boost circuit is arranged at a position where is near the circuit board 370 and at the inner circumferential side of the fixed barrel 60 about the circumferential position where the circuit boards 270 and 370 are not provided. The stepping motor 374 is used for a focus motor and the like, for example, and moves a cylindrical member holding a focusing lens to an axis direction.

A rotation axis of the stepping motor 374 is arranged parallel to planes of the circuit boards 270 and 370. Although noise will easily be occurred to the rotation axis direction of the motor 374, by arranging the circuit boards 270 and 370 parallel to the rotation axis of the motor 374, the noise will be hard to overlapping to wirings of the circuit boards 270 and 370.

In the lens barrel according to the present embodiment, since a circuit board 270 to which electronic components 272 such as a control circuit, sensors and the like are mounted, can be arranged as multilayered, number of electronic components 272 which are available to be equipped in the fixed barrel 60 can be increased. If the number of the electronic components can be increased, it contributes to multi function and downsizing of the lens barrel.

Also, in the present embodiment, since the high voltage series electronic components 372 such as the boost circuit and the like can be spaced from a large number of the low voltage series electronic components 272 and the control circuit 72*b*, it is available to prevent overlapping noise to the electronic components 272 for controlling and communicating as much as possible, high-accurate controlling and communication may be operated. Other functions and effects of the present embodiment are similar to the above mentioned first embodiment.

Third Embodiment

Figure 5:
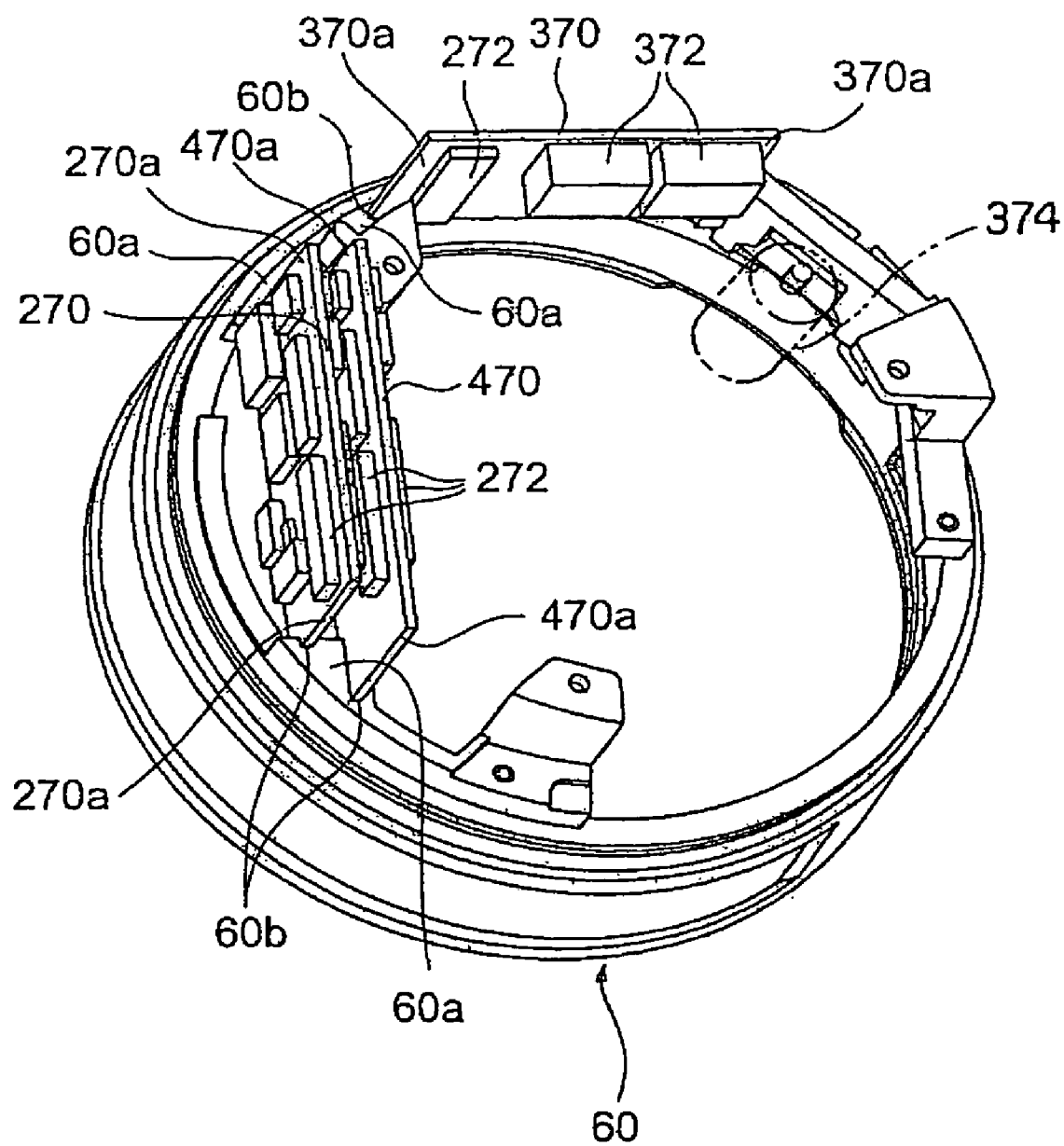

In a third embodiment of the present invention, other than specified in following, it is similar with the above mentioned second embodiment, and functions and effects similar to the second embodiment will be achieved. As shown in FIG. 5, more than two holding grooves 60*b* are respectively formed at a pair of inward convex edges 60*a* laying next to each other formed at an inside of the fixed barrel 60. Each of side edge portions 270*a* and 470*a* which is front of the optical axis direction in the respective circuit boards 270 and 470 are inserted detachably to the holding groove 60*b* formed on the adjacent pair of the inward convex edges 60*a*, and the circuit boards 270 are arranged as overlapping more than two stages along a radial direction.

Besides, in the present embodiment, a width of the circuit board 470 positioned at a radial inner side of the fixed barrel 60 of the circuit boards 270 and 470 arranged more than two is formed to be larger than that of the circuit board 270 arranged at an outer side. According to the present embodiment, further larger number of the electronic components 272 can be equipped in the fixed barrel 60, as compared with the second embodiment.

Fourth Embodiment

Figure 6:
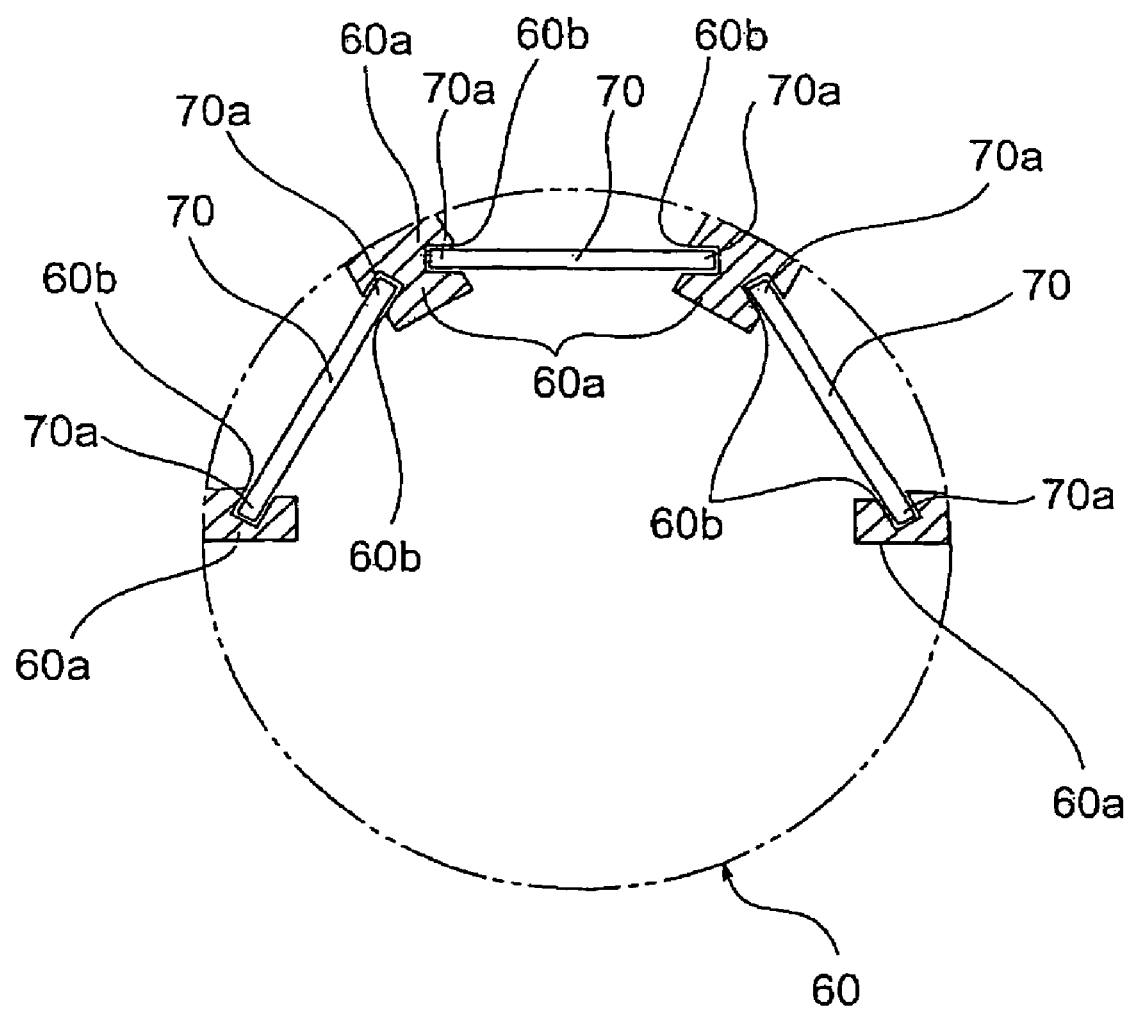
FIG. 6 is a schematic view showing one part of a lens barrel according to the other embodiment of the present invention.

In a fourth embodiment of the present embodiment, other than specified in following, it is similar with the above mentioned first to third embodiments, and functions and effects similar with these will be achieved. As shown in FIG. 6, four inward convex edges 60*a* are formed along a circumferential direction at an inside of the fixed barrel 60 with predetermined intervals. Side end portion 70*a* of a circuit board 70 is detachably inserted to holding grooves 60*b* formed on the respective inward convex edges 60*a*. Namely, three circuit boards 70 are arranged side by side along a circumferential direction which is like chords of a circular arc.

In the present embodiment, a width of the individual circuit board 70 can be shortened and a large number of the circuit boards 70 can be arranged at an inside of the fixed barrel 60. Therefore, a total number of electronic components to be mounted to the circuit board 70 can be increased. Note that, although there are those not vertical each other in the present embodiment, circuit boards 70 vertical each other can be arranged by increasing number of the circuit board 70.

Note that, the present invention is not limited to the above mentioned embodiments, and various modifications can be made. For example, in the present invention, the circuit boards 70, 270, 370, 470 and/or the reinforcing board 170 may be provided substantially parallel to at least one of the inner face of the most outer circumferential fixed barrel 60 or the outer circumference face of the fixed barrel 60.

Further, in the above mentioned embodiments, although side end edge portion 70*a*, 170*a*, 270*a*, 370*a*, 470*a* of the circuit boards 70, 270, 370, 470 or the reinforcing board 170 were detachably fixed by inserting to the holding grooves 60*b*, adhesive agent may be used before and after insertion fixing. However, in this case, it will be difficult to take out the circuit boards 70, 270, 370, 470 or the reinforcing board 170 without releasing the adhesive agent bonding.

Figure 7:
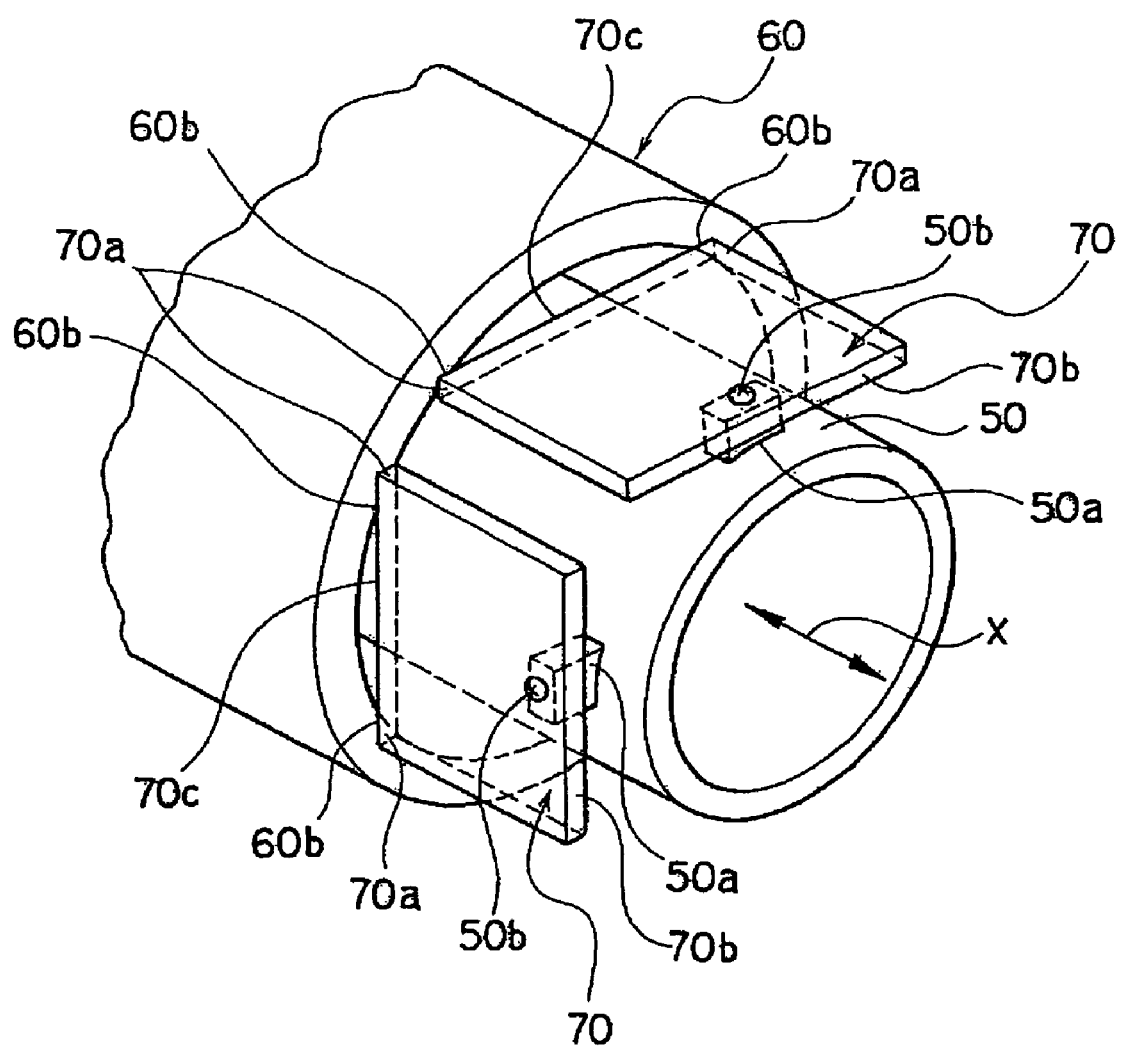
FIG. 7 is a main section perspective view of a lens barrel according to the other embodiment of the present invention.

Furthermore, in the above mentioned embodiment, although it is specified the lens barrel to be mounted for a single lens reflex camera, the lens barrel according to the present invention may be mounted to an optical device other than a camera body. Also, the lens barrel according to the present invention may be a lens barrel of the one other than a single lens reflex camera, for example, a lens barrel for a camera in which a lens barrel and a camera body are fixed. Also, the lens barrel may be used for optical devices such as a cell phone, a binocular, a telescope and the like, other than a still camera, Fifth Embodiment In a fifth embodiment of the present embodiment, other than specified in following, it is similar with the above mentioned first to fourth embodiments, and functions and effects similar with these will be achieved. As shown in FIG. 7, in this embodiment, side end portions 70*a* of the respective circuit board 70 are held by the holding grooves 60*b* formed on the outer circumferential side fixed barrel 60, and the side end portions 70*a* are detachably fixed to projected portions 50*a* formed on the outer circumference of the inner circumferential side fixed barrel 50 by bis 50*b* and the like.

In the case of the present embodiment, rear end portions 70*b* of the optical axis X direction in the circuit board 70 can be fixed to the fixed barrel 50 without contact to an inner face of the covering member 62 (refer to FIG. 1) positioned at an opposite side of an insertion direction of the circuit board 70 to be inserted into the holding grooves 60*b*.

Figure 8:
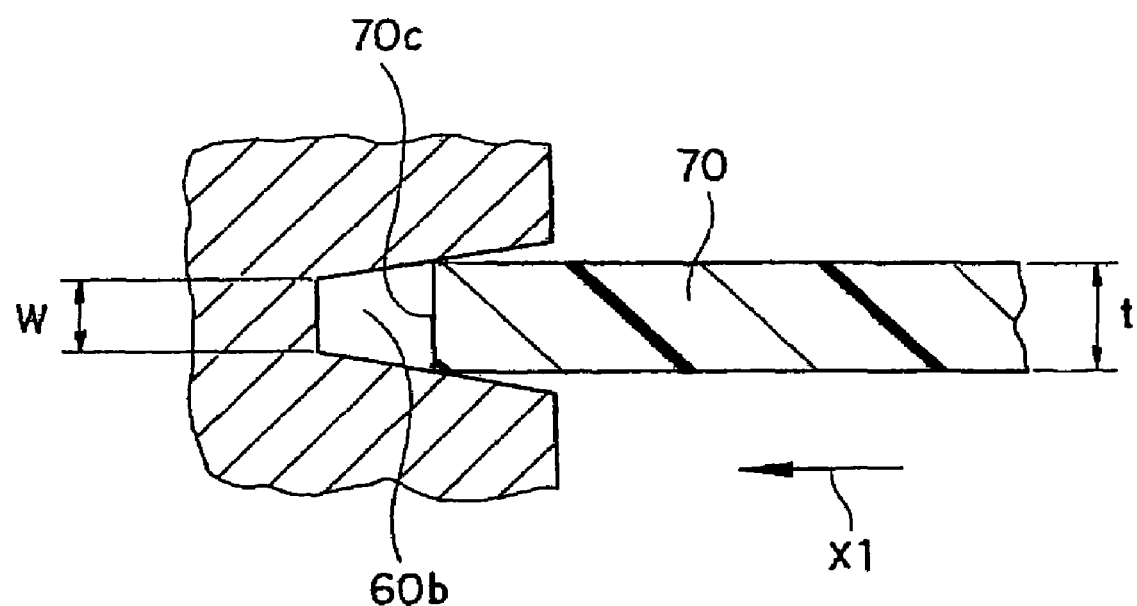
FIG. 8 is a main cross sectional view of a supporting groove shown in FIG. 7.

Also, in the present embodiment, as shown in FIG. 8, the holding groove 60*b* is formed as tapered shape towards an insertion direction X1 so that a width W becomes as narrow as or narrower than a thickness t of the circuit board 70. Of course, an entrance of each holding grooves 60*b* is wider than the thickness t of the circuit board 70. By forming the length width W to be narrower in the direction as tapered shape, a tip end 70*c* of the circuit board 70 becomes easy to insert, further, it becomes easy to fix in the holding groove 60*b* and saccadic is prevented. Also, since the fixed barrel 60, to which the holding groove 60*b* is formed, is integrally molded by, for example, a resin mold, the tapered shape holding groove 60*b* is preferable for making die cutting easier.

Note that, a groove width of the holding groove 60*b* may be same as or more than equal to the thickness t of the circuit board 70 without narrowing the groove width as tapered shape to the insertion direction of the circuit board 70. Also, the groove width may be narrowed as tapered shape to a direction which is vertical to the insertion direction X1 parallel to a plane of the circuit board 70.

Sixth Embodiment

Figure 9:
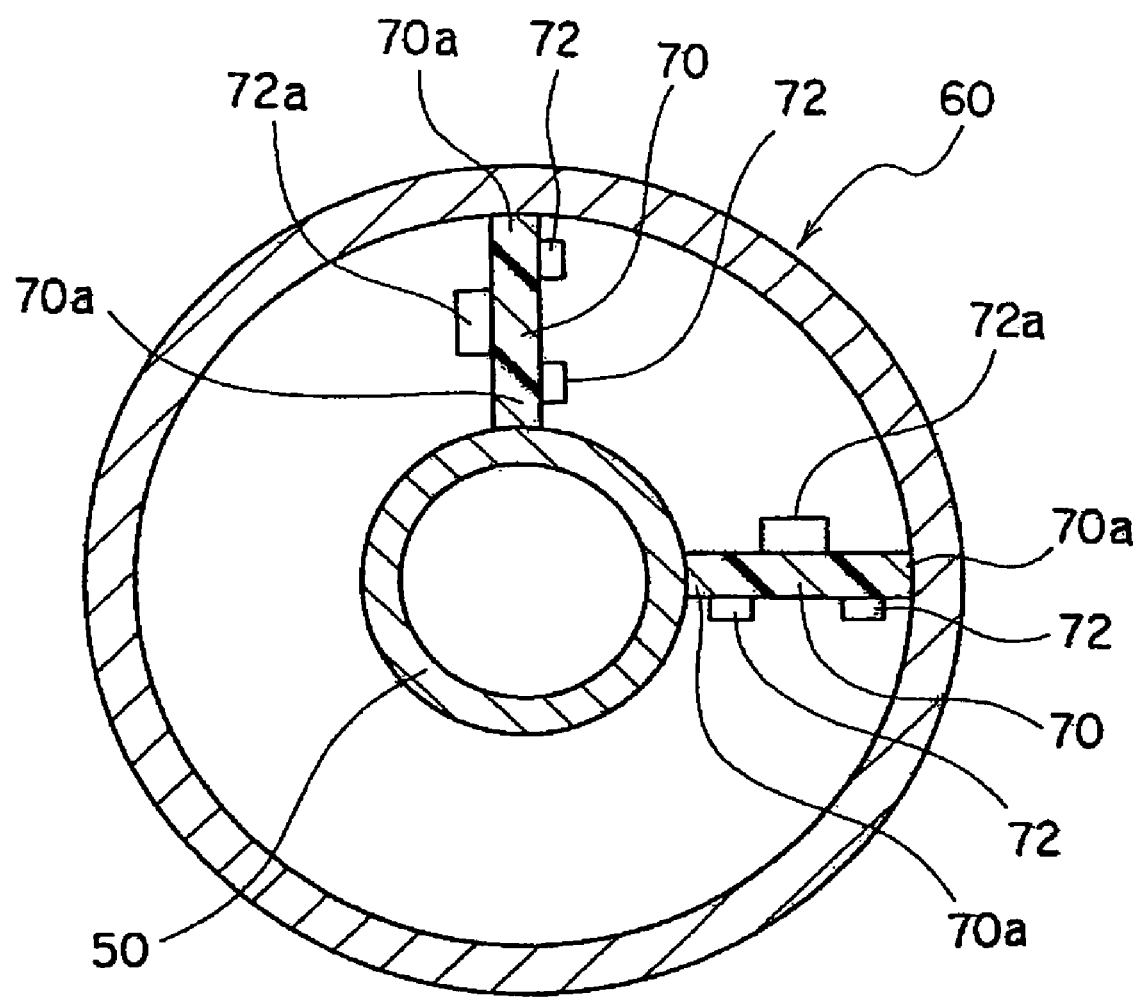
FIG. 9 is a schematic cross sectional view of a lens barrel according to the other embodiment of the present invention.

In a sixth embodiment of the present invention, other than specified in following, it is similar with the above mentioned first to fourth embodiments, and functions and effects similar with these will be achieved. As shown in FIG. 9, in the present embodiment, two circuit boards 70 are arranged to be substantially vertical between the inner circumferential side fixed barrel 50 and the outer circumferential side fixed barrel 60, further, side end portions 70a of the respective circuit boards 70 are fixed to the fixed barrels 50 and 60, respectively. In the present embodiment, the circuit board 70 is provided on a plane which passes though an optical axis of said optical system.

The angular velocity sensors 72a and other electronic components 72 are mounted on the respective circuit boards 70. The respective circuit boards 70 are arranged parallel to a radial direction of the fixed barrels 50 and 60. By making such arrangement of the circuit board 70 depending on the size of fixed barrels 50 and 60, better use of space can be achieved. Note that, the circuit board 70 arranged between the fixed barrel 50 and 60 may be more than three.

Seventh Embodiment

Figure 10:
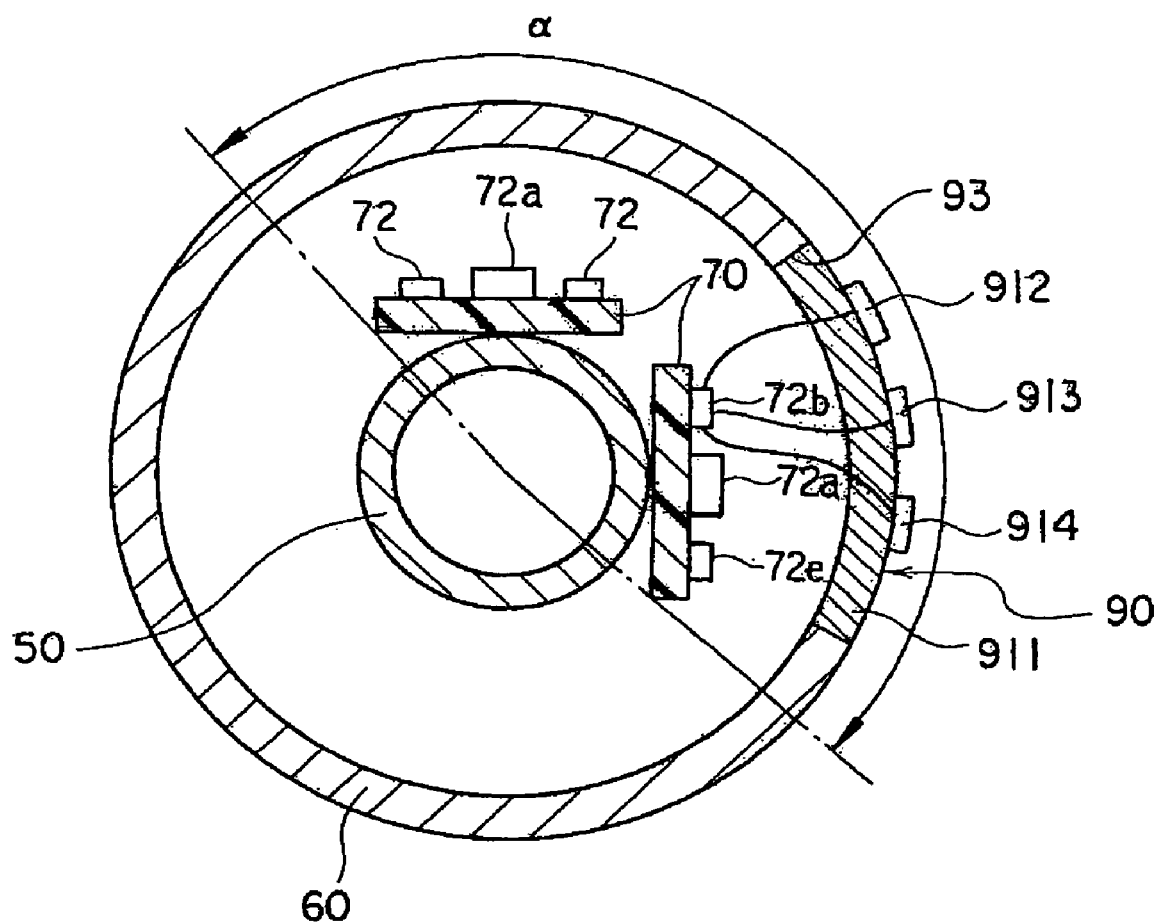
FIG. 10 is a schematic cross sectional view of a lens barrel according to further another embodiment of the present invention.

In a seventh embodiment of the present invention, other than specified in following, it is similar with the above mentioned first to fourth embodiments, and functions and effects similar with these will be achieved. As shown in FIG. 10, in the present embodiment, two circuit boards 70 are maintained as being vertically each other at an inner side of the outer circumferential side fixed barrel 60 and outer circumference of the inner circumferential side fixed barrel 60. In this embodiment, the circuit board 70 is provided on a plane which does not pass through an optical axis of said optical system.

The angular velocity sensors 72a and other electronic components 72 are mounted on the respective circuit boards 70. In the other electronic components 72, a plurality of the electronic components 72 comprises a control circuit 72b to perform controlling by using signals supplied from the angular velocity sensors 72a.

Adjusting components 72e such as volume, memory and the like to adjust control properties of the control circuit 72b are provided near the control circuit 72b on the circuit board 70 to which the circuit board 72b is provided. A through hole 93 is formed at the outer circumferential area α of the outer circumferential side of the fixed barrel 60 which faces to the circuit board 70 to which the control circuit 72b. At the position where the through hole 93 is formed, a switching member 90 to cover the through hole 93 is provided. The switching member 90 is fixed to the fixed barrel 60 by a screw, adhesive agent and the like, and is a removable member from the fixed barrel.

Figure 11:
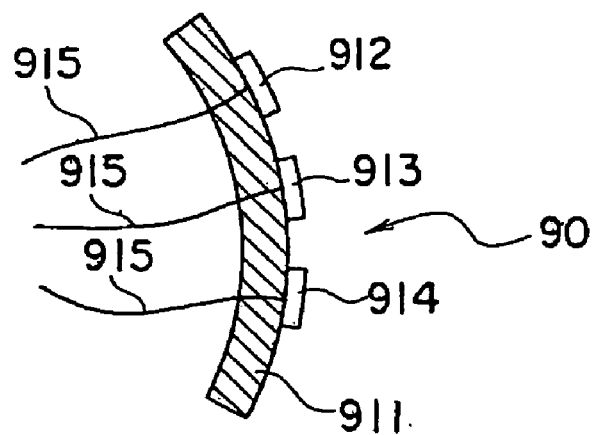
FIG. 11 is a main section schematic view of FIG. 10.

As shown in FIG. 11, switches 912, 913, 914 to change over the controlling by the control circuit 72b are provided on the switching member 90. The switches 912, 913, 914 are connected to the control circuit 72b via wiring 915, respectively. According to changing the switches 912, 913 and 914, controlling with respect to various image shooting such as focusing operation, image blurring compensation operation and the like is switched in the control circuit.

In the embodiment shown in the drawing, because the switching member 90 facing the adjusting components 72e is provided, the adjusting member 72e can be exposed by removing the switching member 90 from the fixed barrel 60. Therefore, with respect to the exposed adjusting member 72e, adjusting operations such as adjusting volume, rewriting memorized information and the like can be operated easily.

The changeover switches like the above may be provided at the outer circumferential area α of the outer circumferential side fixed barrel 60 facing the above mentioned circuit boards 70, 170, 270, 370 of the first to sixth embodiments, as similar to the seventh embodiment.

The invention claimed is:

1. A lens barrel comprising:
a first barrel;
a second barrel having an inner face facing an outer face of the first barrel; and
a circuit board supported by the second barrel, the circuit board provided between the first barrel and the second barrel; and
an optical system supported by at least one of said first barrel or said second barrel, wherein
said circuit board comprises a first circuit board and a second circuit board, said first and second circuit boards are provided in substantially parallel with an optical axis of said optical system, and said first and said second circuit boards are provided at a crossing direction.

2. The lens barrel as set forth in claim 1, wherein
said second barrel is a fixed barrel so as not to cause relative movement with said first barrel.

3. The lens barrel as set forth in claim 1 comprising:
an electronic component provided on said first circuit board;
a control circuit provided on said second circuit board, which performs controlling by using a signal supplied from said electronic component; and
a connecting section having low rigidity with respect to said first and second circuit boards, which connects said first circuit board and said second circuit board.

4. The lens barrel as set forth in claim 1, wherein
angular velocity sensors are equipped with said first circuit board and said second circuit board, respectively.

5. The lens barrel as set forth in claim 4 further comprising:
a control circuit provided at an inner portion of said second barrel to perform controlling by using a signal supplied from said angular velocity sensors; and
a flexible circuit board having low rigidity with respect to said first and second circuit boards, which connects said angular velocity sensors and said control circuit.

6. The lens barrel as set forth in claim 5, wherein
said control circuit is provided on at least one of said first circuit board and said second circuit board, and
the other circuit different from the control circuit is provided on the other one of them.

7. The lens barrel as set forth in claim 6, wherein
said control circuit is provided on one of said first circuit board and said second circuit board, and
a high voltage output circuit is provided on the other of said first circuit board and said second circuit board, which outputs a voltage higher than a voltage provided to said control circuit.

8. The lens barrel as set forth in claim 1, wherein
said circuit board is a rigid board.

9. The lens barrel as set forth in claim 1, wherein
said circuit board is provided with a space apart from said first barrel.

10. The lens barrel as set forth in claim 1 comprising:
a moving barrel provided between said first barrel and said second barrel, said moving barrel holding said optical system and relatively moving along an optical axis direction with respect to said first barrel and said second barrel.

11. The lens barrel as set forth in claim 10 comprising:
a detecting portion provided at an inner circumference side of said circuit board to detect movement of said moving barrel.

12. The lens barrel as set forth in claim 10 comprising:
a motor fixedly provided on at least one of said first barrel and said second barrel so as to move said moving barrel, wherein
said circuit board is provided substantially parallel to a rotation axis of said motor.

13. The lens barrel as set forth in claim 12, wherein
said circuit board is provided at a portion where said motor is not provided along a circumference direction of said first barrel and said second barrel.

14. An optical device comprising the lens barrel as set forth in claim 1.

15. The lens barrel as set forth in claim 1, wherein the first and the second circuit boards are provided in a rectangular crossing direction with respect to each other.

16. A lens barrel comprising:
a first barrel;
a second barrel having an inner face facing an outer face of the first barrel; and
a circuit board supported by the second barrel, the circuit board provided between the first barrel and the second barrel, wherein
said second barrel comprises a first groove portion to which a first end portion provided at one end of said circuit board is inserted, a second groove portion to which a second end portion opposite to said first end portion is inserted, and a contact portion to which a third end portion intersecting said first end portion and said second end portion contacts.

17. The lens barrel as set forth in claim 16 comprising:
an elastic member which provides an elastic force to a fourth end portion opposite to said third end portion of said circuit board.

18. A lens barrel comprising:
a first barrel;
a second barrel having an inner face facing an outer face of the first barrel; and
a circuit board supported by the second barrel, the circuit board provided between the first barrel and the second barrel, wherein
said circuit board comprises a first base plate and a second base plate which are facing each other.

19. The lens barrel as set forth in claim 18, wherein
said first base plate is provided at a closer side to said first barrel with respect to said second base plate, and said first base plate has a larger area with respect to said second base plate.

20. The lens barrel as set forth in claim 18 comprising:
an optical system held on at least one of said first barrel and said second barrel, wherein
said circuit board is provided on a plane which does not pass through an optical axis of said optical system.

21. An optical device comprising the lens barrel as set forth in claim 18.

22. A lens barrel comprising:
a first barrel;
a second barrel having an inner face facing an outer face of the first barrel; and
a circuit board supported by the second barrel, the circuit board provided between the first barrel and the second barrel, wherein
said circuit board is fixed on said first barrel and said second barrel.

23. The lens barrel as set forth in claim 22 comprising:
an optical system held on at least one of said first barrel and said second barrel, wherein
said circuit board is provided on a plane which passes through an optical axis of said optical system.

24. A lens barrel comprising:
a first barrel;
a second barrel having an inner face facing an outer face of the first barrel;
a circuit bard supported by said first barrel and provided between an outer face of said first barrel and an inner face of said second barrel;
a control circuit mounted on said circuit board to perform controlling necessary for image taking;
an adjusting component provided on said circuit board and adjustable properties of said control circuit; and
a removable member provided removably from said second barrel and facing said adjusting component, said removable member including a switching portion so as to switch the controlling by said control circuit.

25. The lens barrel as set forth in claim 24, wherein
said second barrel includes a through hole at a portion facing said adjusting component, and
said removable member is provided on said through hole of the second barrel.

26. A method for manufacturing a lens barrel comprising:
providing a second barrel at an outer circumference side of a first barrel;
attaching a circuit board, on which an electronic component is provided, to the second barrel so that the circuit board faces an outer circumferential surface of the first barrel and an inner circumferential surface of the second barrel;
providing a control circuit at an inner portion of said second barrel to process a signal supplied from said electronic component; and
connecting said electronic component and said control circuit via a connecting portion having lower rigidity with respect to said circuit board.

27. A lens barrel comprising:
a first barrel;
a second barrel having an inner face facing an outer face of the first barrel; and
a circuit board supported by the second barrel, the first circuit board provided between the first barrel and the second barrel, wherein
the circuit board comprises a first circuit board and a second circuit board, the first and second circuit boards being provided as substantially parallel with an optical axis of the optical system, and the first and second circuit boards being provided at a crossing direction with respect to each other.

28. The lens barrel as set forth in claim 27, wherein
the first and second circuit boards are provided in a rectangular crossing direction with respect to each other.

29. An optical device comprising the lens barrel as set forth in claim 27.

30. The lens barrel as set forth in claim 27, wherein angular velocity sensors are equipped with the first circuit board and the second circuit board, respectively.

* * * * *